US006951660B2

(12) United States Patent
Brown et al.

(10) Patent No.: US 6,951,660 B2
(45) Date of Patent: Oct. 4, 2005

(54) CONFECTIONERY COATINGS

(75) Inventors: Peter Arthur Brown, Peterborough (GB); Anthony John Prange, Peterborough (GB); Roger David Coulthard, Peterborough (GB)

(73) Assignee: APV Systems Limited, Peterborough (GB)

(*) Notice: Subject to any disclaimer, the term of this patent is extended or adjusted under 35 U.S.C. 154(b) by 545 days.

(21) Appl. No.: 10/011,816

(22) Filed: Oct. 22, 2001

(65) Prior Publication Data

US 2002/0090437 A1 Jul. 11, 2002

Related U.S. Application Data

(63) Continuation-in-part of application No. PCT/GB00/01555, filed on Apr. 19, 2000.

(30) Foreign Application Priority Data

Apr. 22, 1999 (GB) ............................................ 9909276
Jul. 28, 1999 (GB) ............................................ 9917657
Aug. 27, 1999 (GB) ............................................ 9920303
Oct. 22, 1999 (GB) ............................................ 9924925

(51) Int. Cl.[7] ................................................ A23G 3/00
(52) U.S. Cl. ....................... 426/101; 426/565; 426/104; 426/306; 426/302; 261/140.1
(58) Field of Search ................................ 426/565, 104, 426/306, 101, 302; 261/140.1

(56) References Cited

U.S. PATENT DOCUMENTS 3,508,932 A 4/1970 Pilz
3,532,513 A * 10/1970 Katz .......................... 426/572
3,535,517 A 10/1970 Eason ....................... 250/43.5
4,081,559 A 3/1978 Jeffery et al.
4,418,089 A 11/1983 Bouette
4,499,113 A 2/1985 Mochizuki et al.
5,017,390 A * 5/1991 Sawant ....................... 426/100
5,292,030 A * 3/1994 Kateman et al. ............... 62/74
5,370,888 A 12/1994 Hachiya et al.
5,433,967 A * 7/1995 Kateman et al. ............ 426/565
6,482,464 B1 * 11/2002 Asama et al. ............... 426/631

FOREIGN PATENT DOCUMENTS

| | | | |
|---|---|---|---|
| CH | 680411 | | 8/1992 |
| DE | 4203086 | | 5/1993 |
| DE | 4214581 | | 7/1993 |
| EP | 0322952 | | 7/1989 |
| EP | 0502360 | | 9/1992 |
| EP | 0724836 | | 8/1996 |
| EP | 0919133 | | 6/1999 |
| FR | 2508280 | | 12/1982 |
| GB | 1297579 | | 11/1972 |
| GB | 2070197 | | 9/1981 |
| GB | 2217174 | | 10/1989 |
| JP | 613539 | | 2/1986 |
| JP | 6156045 | | 3/1986 |
| JP | 62259543 | | 11/1987 |
| JP | 2207743 | | 8/1990 |
| JP | 3240442 | | 10/1991 |
| JP | 6319458 | | 11/1994 |
| WO | WO9521536 | | 8/1995 |
| WO | WO0064269 | | 2/2000 |
| WO | WO00/78156 | * | 6/2000 |

* cited by examiner

*Primary Examiner*—N. Bhat
(74) *Attorney, Agent, or Firm*—John P. White; Cooper & Dunham LLP

(57) ABSTRACT

A process for producing an aerated confectionery coating comprises supplying a liquid confectionery material to a coating head, maintaining the material under substantial super-atmospheric pressure up to the vicinity of the coating head, and forming, by gas injection, gaseous bubbles in the pressurized confectionery material prior to the confectionery material reaching the coating head, the rate of injection of gas into the confectionery material being controlled in response to a measure of the density of confectionery material in the supply to the coating head, excess liquid confectionery material available after coating by the coating head being recirculated into said supply.

42 Claims, 15 Drawing Sheets

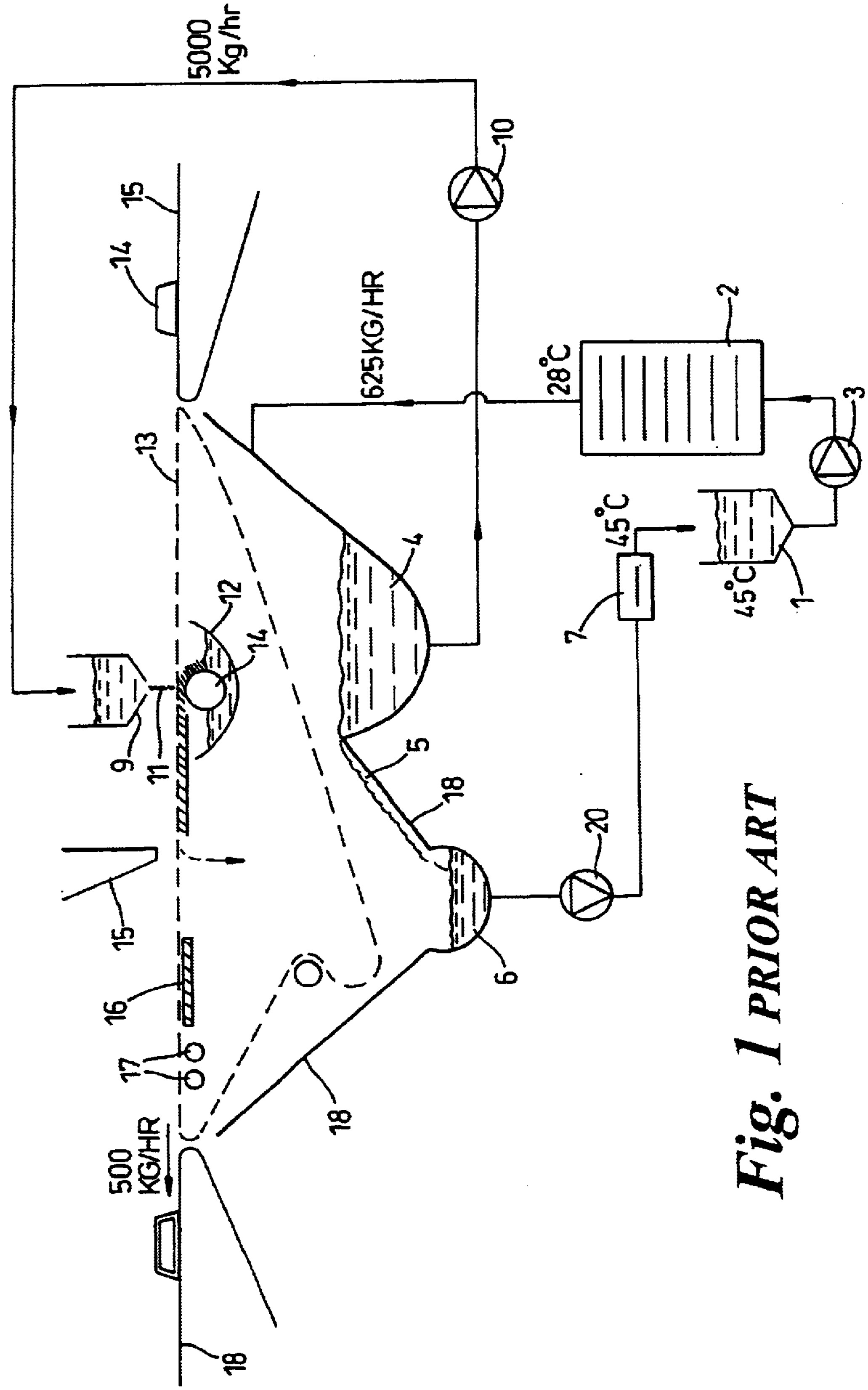
*Fig. 1* PRIOR ART

| Sample | Bar | Mean air pocket size (µm) | Standard Deviation | Standard Error | Minimum size (µm) | Maximum size (µm) | Range |
|---|---|---|---|---|---|---|---|
| 11% aeration | Bar 1 | 37 | 9.8 | 2.8 | 9 | 46 | 38 |
| | Bar 2 | 52 | 1.3 | 4.4 | 45 | 57 | 12 |
| 13% aeration | Bar 1 | 48 | 3 | 0.9 | 43 | 51 | 8 |
| | Bar 2 | 46 | 4.5 | 1.3 | 38 | 57 | 19 |
| 16% aeration | Bar 1 | 59 | 9 | 2.6 | 49 | 77 | 31 |
| | Bar 2 | 51 | 11.6 | 3.4 | 37 | 82 | 45 |

*Fig. 20*

CONFECTIONERY COATINGS

This application is a continuation-in-part of PCT International Application No. PCT/GB00/01555, filed Apr. 19, 2000, designating the United States of America, which claims priority of Great Britain Serial No. 9909276.9, filed Apr. 22, 1999, Great Britain Serial No. 9917657.0, filed Jul. 28, 1999, Great Britain Serial No. 9920303.6, filed Aug. 27, 1999 and Great Britain Serial No. 9924925.2, filed Oct. 22, 1999, the contents of which are hereby incorporated by reference into the present application.

This invention relates to the production of confectionery coatings and particularly to the production of coatings containing gaseous bubbles, such as chocolate coatings containing bubbles of air. The bubbles are generally microscopic, that is they are not readily detected by the unaided human eye. The invention also relates to an aeration control system for controlling the aeration of a liquid.

Methods for producing aerated chocolate bar fillings are well known, and such chocolate bars are popular. There appears, however, to be no satisfactory production process for making and applying an aerated confectionery coating having a substantially unblemished outer surface, that is a surface that is not interrupted by broken bubbles. Additionally the presence of bubbles should not readily be detected within the coating mass. Specification no. GB 1297579 proposed a special chocolate composition for use in an aerated chocolate coating. It was proposed to incorporate up to 5% by weight of one or more polyglycerol ester emulsifiers in a chocolate composition to assist in foaming the hot chocolate with air, and to stabilise the foamed chocolate during subsequent handling of the liquid mass. Only laboratory tests are described; no production equipment is described.

Chocolate coating processes, such as enrobing processes, are generally aimed at avoiding and removing any air bubbles. The present invention is aimed primarily at providing a coating method and apparatus that is capable of being used to provide aerated coatings of substantially conventional chocolate compositions, but the invention can in many cases be used to produce coatings of other confectionery materials containing gaseous bubbles.

The coating processes of the invention may be used to coat biscuits, confectionery items such as soft centres, bar combinations, frozen confectionery items, cakes and setting yoghurts etc.

The invention is particularly applicable to enrobing processes in which the product to be coated passes through a curtain of coating material, but it should be appreciated that the coating head may be employed to coat the product in other ways, such as by spraying or by feeding a bath of coating material in which the product is dipped, the excess coating material on the product being removed by the usual methods.

Where the context admits, the term 'aerated' will be used herein to cover bubbles containing gases other than air. For example, bubbles of nitrogen may be used.

According to one aspect of the invention a process for producing an aerated confectionery coating comprises supplying a liquid confectionery material to a coating head, maintaining the material under substantial super-atmospheric pressure up to the vicinity of the coating head, and injecting gaseous bubbles into the pressurised confectionery material prior to the confectionery material reaching the coating head, the rate of injection of gas into the confectionery material being controlled in response to a measure of the density of confectionery material in the supply to the coating head, excess liquid confectionery material delivered by the coating head being recirculated into said supply.

Preferably the bubbles are of generally microscopic size.

The density of the confectionery material being fed in said supply to the coating head will depend amongst other things on the volume of excess aerated coating material that has been recirculated from the coating head. In general, with conventional coating processes when coating a series of discrete items there is a substantial excess of coating material that has to be recirculated. This will generally be the case also with the inventive process, and the process in accordance with the first aspect of the invention is concerned with controlling the aerator to take account of the fact that fresh coating material being supplied from the material source is not aerated, whereas the recirculated material is generally still at least partially aerated.

Preferably the density measurement is made at a position in the pressurised supply that is downstream of the aeration device.

The aeration device may then be controlled also in response to a measure of the density of the confectionery material in the supply to the aeration device, ie upstream of the aeration device.

The aeration device is preferably an aerating head of the kind in which after injection the confectionery material is subjected to shearing forces in order to reduce the bubble size.

The pressure of the coating material in the outlet from the aeration device is preferably substantially in the range 2 to 10 atmospheres, above atmospheric pressure, and preferably substantially in the range 3 to 6 atmospheres above atmospheric pressure.

The pressure in the pressurised supply of confectionery material may be created by a back-pressure means in the form of a flow restrictor positioned in the vicinity of the coating head, just prior to the inlet thereof. This arrangement has the advantage that a coating head having a conventional open-to-atmosphere inlet may be used, and thus the invention may be used as a conversion to an existing enrobing facility whilst retaining the existing coating head.

A suitable form of flow restrictor may comprise a deformable duct and means for applying an external deforming force to the duct in a controlled manner so as to vary the cross-sectional bore of the duct.

Use of an open-to-atmosphere coating head inlet will generally lead to some loss of bubbles, and a preferred arrangement, subject to costs, is to provide a coating head which is so arranged as to generate a suitable back-pressure at the inlet of the coating head.

Further aspects of the invention are concerned with the design of coating heads that are capable of operating at such relatively high inlet pressures.

According to a second aspect of the invention a coating head suitable for creating a curtain of aerated coating material comprises an elongate manifold capable of withstanding an internal pressure of several atmospheres super-atmospheric, the manifold being provided with an inlet and with an elongate outlet slot extending for substantially the full length of the manifold, and the width of the slot being controlled by an adjustable gate.

The gate may be a rigid elongate member which is slideably adjustable in the transverse direction thereof to control the width of the outlet slot.

Alternatively the gate may be an inflatable tube, preferably a tube of flattened shape, the internal pressure of the tube being controllable to effect adjustment of the width of the outlet slot.

An inflatable tube has the advantage that the gate can act as an automatic pressure compensator, since an increase in manifold pressure will tend to collapse the tube so as to reduce the manifold pressure by opening up the manifold outlet slot.

Alternatively, other means may be used to apply a pressure to the manifold such as an air-actuated diaphragm or a piston within the manifold.

The manifold is preferably in the form of a tube with end caps, which preferably are both removable for cleaning purposes.

An excess pressure relief means is preferably provided on the manifold, preferably at the end thereof.

In one preferred embodiment the manifold is provided with an outlet roller which in part defines the outlet slot, and a roller scraper is provided externally of the manifold for removing confectionery material carried round by the roller, in order to create a curtain which hangs down from the scraper.

When it is desired to coat the underside of items as well as the top of the items then, as is well known in the conventional coating with chocolate, a trough can be positioned beneath the coating head, under a foraminous conveyor which conveys the items past the coating head, and various devices known in the art can be employed for applying the coating material in the trough to the underside of the items.

The present invention does, however, enable the underside of the conveyed items to be coated by employing a manifold beneath a foraminous conveyor with an outlet slot which is directed generally upwards and beneath the conveyor, the pressure in the manifold being sufficient to cause a ribbon of coating material to be extruded with an upward component of movement in order to contact the underside of the conveyed items. That manifold then constitutes said coating head.

Preferably an upwardly-inclined guide plate is provided adjacent to the manifold outlet slot for guiding the extruded ribbon of confectionery material in an upward direction from the manifold, and towards the underside of the receding items on the conveyor.

Although it is generally advantageous to employ a measure of the density of the aerated confectionery material, either during running of the process or during a process setting-up operation, to control the aerator, it may be possible to employ some other control parameter in some circumstances.

The third and fourth aspects of the invention are concerned with achieving a relatively high level of aeration and small bubble size in chocolate being supplied to a coating head by recirculating excess aerated chocolate from the coating head, without substantial de-aeration, through the aerator.

According to the third aspect of the invention we provide apparatus for producing an aerated chocolate coating on a product, the apparatus comprising a coating head, a supply conduit to the coating head from an aeration means, and means for maintaining the supply at a substantial super-atmospheric pressure up to the vicinity of the coating head, a reservoir for collecting excess chocolate delivered by the coating head, a recirculation means for returning excess chocolate directly from the reservoir to the aeration means, at least most of the excess chocolate not having passed through a de-aerator, whereby an amplification of the amount of aeration present in the chocolate applied to the product is produced by recirculating excess aerated chocolate through the aeration means, and a fresh chocolate supply for supplementing the excess chocolate with fresh chocolate from a temperer.

According to a fourth aspect of the invention we provide a process for producing an aerated chocolate coating on products comprising supplying liquid chocolate to a coating head maintaining the chocolate under substantial super-atmospheric pressure up to the vicinity of the coating, forming, by gas injection in an aerator, gaseous bubbles in the pressurised chocolate prior to the chocolate reaching the coating head, excess liquid chocolate delivered by the coating head being collected in a reservoir and being recirculated into said supply, upstream of the aerator, and without being substantially de-aerated, to provide an amplification of the amount of aeration present in the chocolate when applied to the product, and supplementing the excess liquid chocolate by fresh chocolate fed from a temperer.

According to a fifth aspect of the invention we provide edible products coated with an aerated chocolate coating by the process of the fourth aspect of the invention, and preferably the distribution curve of the size of bubbles in the coating has a curve peak which corresponds to a bubble diameter of less than 75 $\mu$m.

Preferably the curve peak corresponds to a bubble diameter of less than 60 $\mu$m.

Most preferably the curve peak corresponds to a bubble diameter of substantially 50 $\mu$m.

According to a sixth aspect of the invention a process for producing an aerated confectionery coating comprises supplying a coating head with at least two supplies of liquid confectionery material and at least one of the supplies being injected with gaseous bubbles.

In the circumstance where a relatively lesser degree of aeration of the coating material suffices, then preferably not all of the supplies of liquid confectionery to the coating head are injected with gaseous bubbles.

According to a seventh aspect of the invention apparatus for producing an aerated confectionery coating comprises a coating head, at least two supply conduits which are in communication with an inlet to the coating head, and aeration means; the aeration means being connected to at least one of the supply conduits and said aeration means being operative to inject gaseous bubbles into liquid confectionery material carried by said one supply.

The density of the confectionery material in a combined supply from said two supply conduits, just prior to or at the inlet to the coating head, is preferably measured, and the density measurement is used to control the aeration means and/or the relative flows in said two supply conduits.

Preferably at least one of said supply conduits is fed from a supply of excess liquid confectionery material which is available after coating.

Preferably not all of the supply conduits to the coating head are connected to aeration means.

Preferably at least one of the supply conduits to the coating head which is not connected to the aeration means is fed at least in part from a supply of excess liquid confectionery material available after coating.

The supply conduit which is connected to the aeration means may be fed from a supply of excess liquid confectionery material available after coating.

Preferably the apparatus comprises control means which is operative to control the relative rates of flow of liquid confectionery material from the supply of excess liquid confectionery material available after coating to (a) the supply conduit/s connected to the aeration means and (b) to the supply conduit/s not connected to the aeration means.

The aerated liquid may be used to create a coating, but may be used for other purposes.

BRIEF DESCRIPTION OF THE DRAWINGS

The invention will now be further described, by way of example only, with reference to the accompanying drawings, in which:

FIG. 1 is a flow diagram of a typical prior art chocolate enrobing production facility, FIG. 20 is a table of statistical analyses of the measurements taken from the histograms of FIGS. 14 to 19.

Referring firstly to FIG. 1, this shows a typical prior art chocolate enrobing facility, and it will be helpful to consider this before discussing the subject invention. In FIG. 1 a holding tank 1 is provided for freshly prepared chocolate melt (and also to contain some recirculated chocolate) which is then fed by a pump 3 through a tempering unit 2 to cool it and initiate controlled crystallisation, as is well known.

Figure 2A:
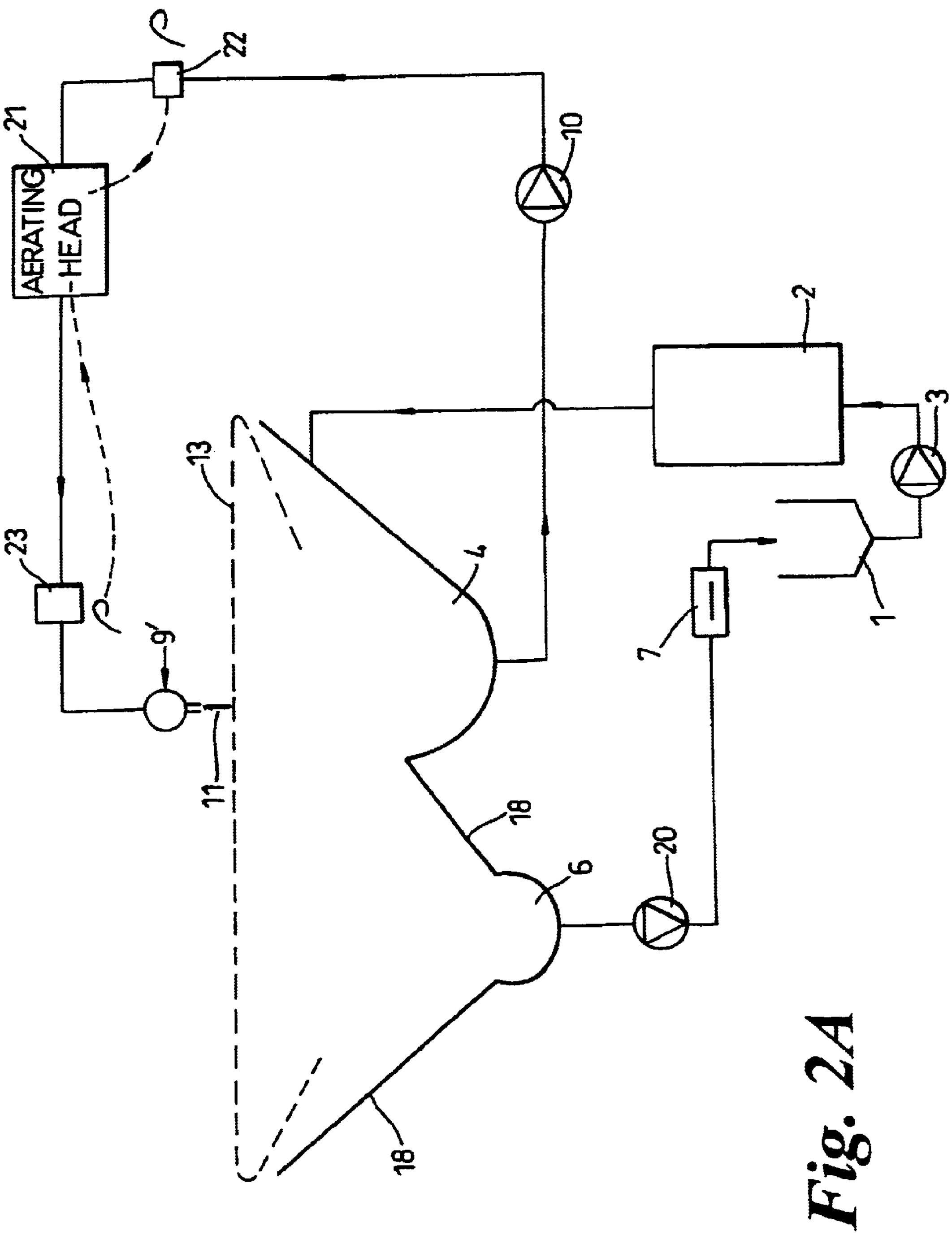
FIG. 2A is a schematic flow diagram of a chocolate coating production facility in accordance with the invention for coating items with an aerated chocolate coating.

The tempered chocolate is fed, at a rate of typically 625 kg/hr to a main reservoir 4 of chocolate provided with an overflow to a return reservoir 6 from which excess chocolate is returned by way of a heater 7 to holding tank 1.

The main reservoir 4 is the supply of chocolate for the coating head 9 to which the chocolate is pumped by pump 10 at a relatively high flow rate of about 5000 kg/hr, that is significantly greater than the rate (about 500 kg/hr) that fresh chocolate is being provided in holding tank 1.

A curtain 11 of chocolate flows down towards a trough 12 and a foraminous, wire conveyor 13 carries items to be coated, such as biscuits 14 from an infeed conveyor 15, through the curtain 11 whereby a chocolate coating is deposited on the top and sides of the biscuits, and surplus chocolate runs into the trough 12. Various devices are known for picking up chocolate from trough 12 to coat the underside of the items on conveyor 13, and a typical roller 14 applicator is shown.

Excess chocolate is removed from the coated biscuits by means of one or more of the following devices: (i) blower 15; (ii) shaker 16 and (iii) licking rolls 17.

The coated biscuits then pass to a discharge conveyor 18. The excess chocolate removed by devices 15, 16 and 17 will be directed by inclined walls 18 into the return reservoir 6, and typically a quantity of 125 kg/hr is returned by pump 20 to the holding tank 1.

FIG. 2A shows a modified chocolate enrobing facility in accordance with the invention, in so far as FIG. 2A shows the changes that are required to the facility of FIG. 1 in order to produce an aerated chocolate coating on the upper surface of items carried by the foraminous conveyor. System parts correspond to those of the facility of FIG. 1 have been corresponding reference numerals in FIG. 2A.

In FIG. 2A an aerating head 21 has been inserted into the supply to the coating head 9', pump 10 has been up-rated to pump chocolate at a similar rate of about 5000 kg/hr but against a substantially increased back pressure of typically 4 atmospheres above atmospheric pressure produced by the modified coating head 9'.

Aerating head 21 can be of the type as sold by Tanis Food Technology B.V., Chroomstraat, 8,3211 AS, Lelystad, The Netherlands under designation No TFT Aerator.

The rate of flow of air fed to the aerating head is controlled in response to measurements of chocolate density as provided by density measurement devices 22, 23 which monitor the chocolate density in the pressurised supply to the coating head 9'.

The aim of controlling the aerating head 21 is to produce a substantially constant density of aerated chocolate being supplied to coating head 9'.

The main control is provided by device 23 in the form of a negative feedback control function to aerating head 21.

The additional measurement device 22 which is upstream of the aerating head 21 will respond to changes in the quantity of air in the chocolate being returned from main reservoir 4 and cause some adjustment of the quantity of air being injected into the chocolate flowing through the aerating head 21.

The devices 22 and 23 are typically of the vibrating tube type, and for example suitable units are those available from PAAR Scientific Limited, 594 Kingston Road, Raynes Park, London SW20 8DN under designation DPR Density meter.

It will be appreciated however that other devices giving an indication of density may equally be used such as a colour meter (colour lightening with increasing aeration) or a viscometer (viscosity increasing with increasing aeration).

Figure 3:
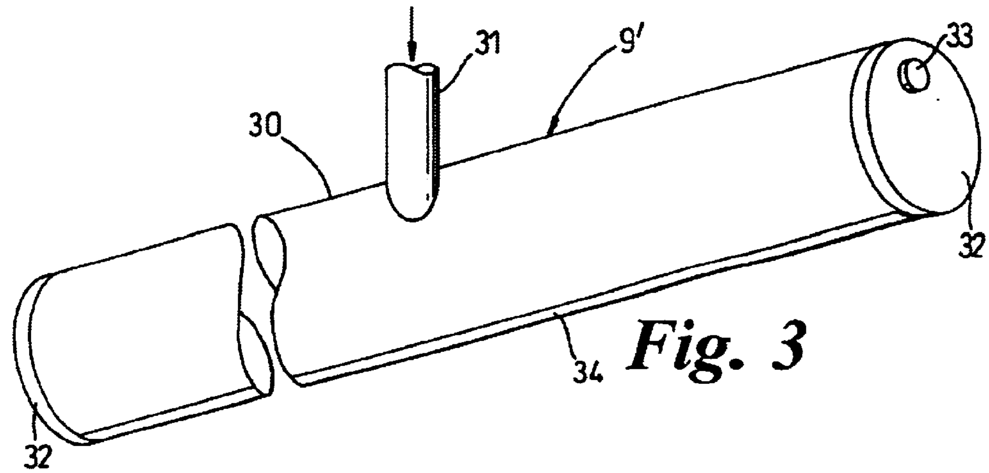
FIG. 3 is a perspective view of a coating head manifold in accordance with the invention and suitable for producing a curtain of aerated chocolate in the facility of FIG. 2A.
Figure 4:
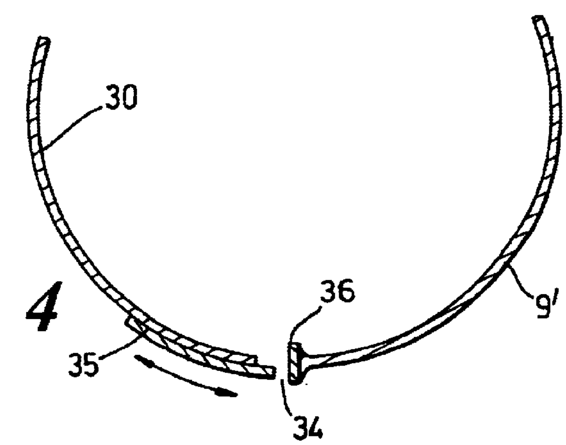
FIG. 4 is a vertical cross-section of the manifold of FIG. 3.

The measures taken in manifold assembly 9' to create a back pressure at the aerating head 21 are described hereafter with reference to FIGS. 3 and 4.

Figure 2B:
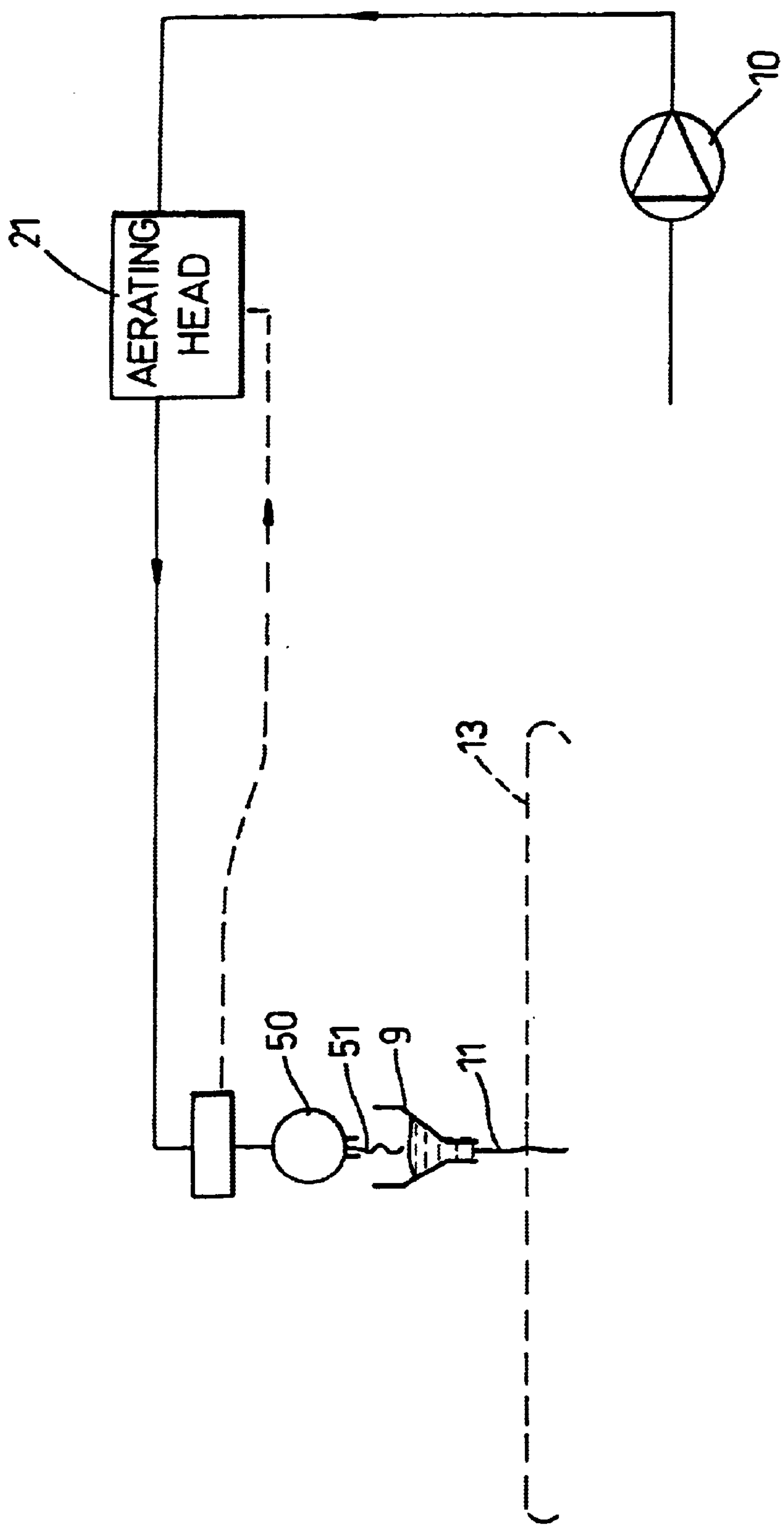
FIG. 2B is a partial flow diagram of a coating facility in accordance with the invention and which is a modification of the facility of FIG. 2A to accommodate a substantially conventional coating head.

FIG. 2B shows an arrangement suitable for use with a conventional hopper-type coating head 9, the hopper of which is open to the atmosphere. In order to maintain pressure in the supply of coating material up to the vicinity of the coating head 9, a flow restrictor 50 is provided just prior to the coating head 9, the outlet 51 of the flow restrictor 50 discharging directly into the hopper of the coating head 9 in order to minimise the loss of bubbles which might occur if a longer flowpath were to be provided from the flow restrictor means 50. A suitable flow restrictor is described hereafter with reference to FIGS. 10 and 11.

The arrangement shown in FIG. 2A produces an amplification of the amount of aeration applied by the aeration head to the amount of aeration which is present in the chocolate when applied to the product. This amplification is approximately in the ratio of the pump flow rate through the aerator head to the pump flow rate from the tempering unit and is due largely to the recirculation of the excess chocolate from the coating head through the aeration head. This amplification could be of particular advantage in applications requiring high levels of aeration (especially in the case of certain 'whipped chocolate' products).

The aerator head incorporates a mechanical shearing action which tends to reduce the size of bubbles present in the chocolate, and recirculation through the aerator results in a reduction in size of bubbles that are already in the supply to the aerator.

Figure 12:
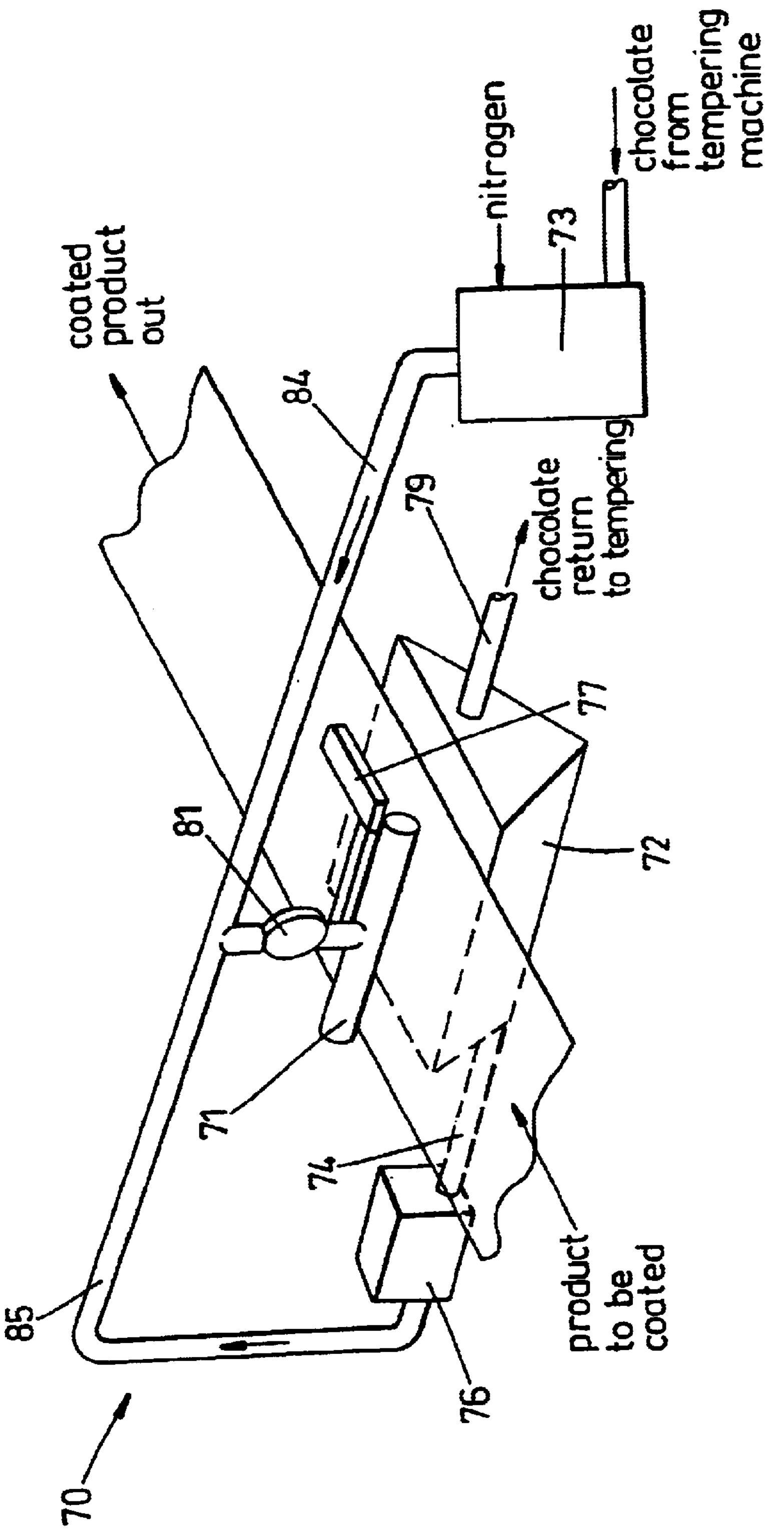
FIG. 12 shows a schematic perspective view of an enrobing apparatus in accordance with the third and fourth aspects of the invention.

FIG. 12 shows chocolate enrobing apparatus in accordance with the fourth aspect of the invention. The apparatus 70 comprises a coating head 71 and may be any one of the manifold types shown in FIGS. 4, 5 or 6. The coating head 71 is located above a reservoir 72 so that excess chocolate resulting from the coating process can be collected therein and recirculated.

A proportion of the liquid chocolate held in the reservoir 72 passes into a conduit 79 which leads to a tempering unit (not shown). After having passed through the tempering unit the chocolate, along with tempered fresh chocolate, then passes through an aerating head 73. The chocolate then flows along a conduit 84 towards an in-line mixer 81. The flow of chocolate through the tempering unit and aerating head is typically 10% of the total flow to the coating head 71. The flow of chocolate to the conduit 79 may be controlled by a weir system or alternatively by an electronic probe.

A conduit 74 is also provided from the reservoir 72 through which chocolate is pumped, by means of a pump 76, from the reservoir 72 to a conduit 85 which leads to the in-line mixer 81. The pump 76 is a positive displacement 'metering' type to ensure a constant flow ratio with the flow of chocolate which passes through conduit 84.

The in-line mixer 81 in this embodiment is provided upstream of the coating head 71 and is operative to mix the chocolate which has passed through the tempering unit and the aerator with the chocolate which has been pumped directly from the reservoir 72. However, it may be possible to dispense with the use of such a mixer.

The apparatus 70 also comprises a density meter 77. The density meter 77 is operative to measure the density of the chocolate flow which has passed through the in-line mixer 81 and as previously described the rate of injection of gas by the aerating head 73 can be controlled in response to the measured density.

It should however be appreciated that as a result of the nature of the apparatus 70 and the stability in aeration level which results, the density meter 77, in some circumstances, may not in fact be necessary. Moreover the amount of aeration injected by the aerating head 73 will be substantially the same as the amount of aeration present in the chocolate which is applied to the product as gradually the level of aeration in the chocolate stored in the reservoir 72 increases.

Advantageously the conduit 85 creates a recirculation loop which enables a smaller aerator unit to be employed.

In accordance with certain requirements the apparatus 70 may be modified so that all of the chocolate contained in the reservoir 72 passes through the tempering unit before either flowing to the aerator head or to the pump 76. This modification would however necessitate a larger tempering unit.

Figure 13:
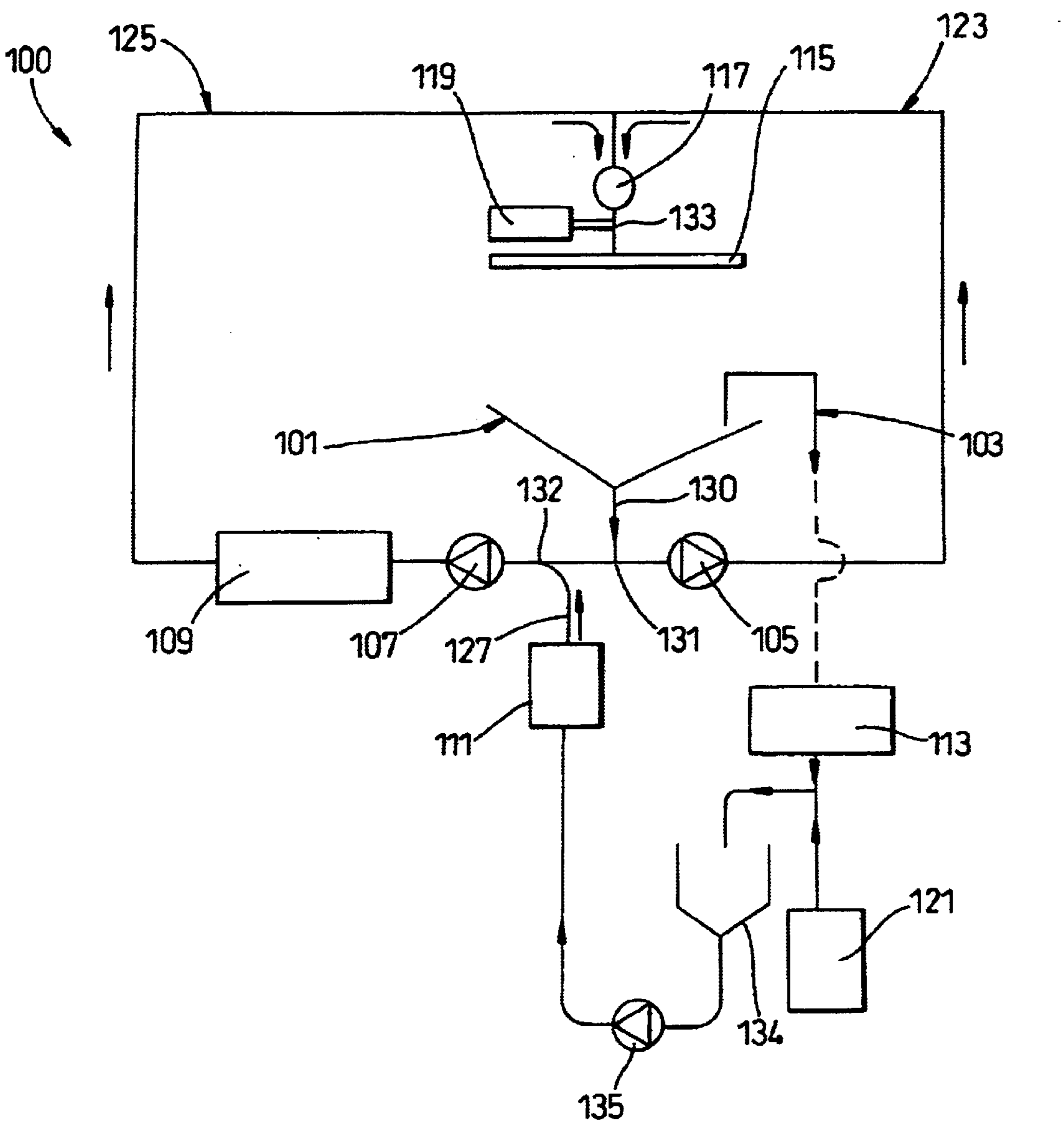
FIG. 13 shows a flow diagram of a further enrobing apparatus in accordance with the third and fourth aspects of the invention.

The flow diagram of FIG. 13 shows chocolate enrobing apparatus 100 and is a modification of the enrobing apparatus 70 of FIG. 12.

A supply conduit 125 and a supply conduit 123 are connected to an inlet of a coating head 115. Supply conduit 125 is connected to an aerator 109. In a similar manner to the enrobing apparatus 70 of FIG. 12, an in-line mixer 117 and an optional density meter 119 are provided next to the coating head 115.

Excess liquid chocolate which is available after coating is collected in a reservoir 101. A return conduit 103 conveys some of the liquid chocolate from a reservoir 101 to a de-temperer and de-aerator unit 113 leading to a holding vessel 134. A variable speed pump 135 feeds chocolate from holding vessel 134 to a tempering unit 111. The flow of chocolate to the conduit 103 may be controlled by a weir system or alternatively by an electronic probe and is generally kept to a minimum as in the prior art system of FIG. 1. Liquid chocolate from a supply 121 of fresh liquid chocolate is also fed into the holding vessel 134.

Importantly, in the enrobing apparatus 100 the aerator 109 is fed not only by the tempering unit 111 via conduit 127 but also by the liquid chocolate contained in the reservoir 101, by way of reservoir bottom outlet 130, T-connection 131, and Y-connection 132. A variable speed pump 107 allows control of the rate of flow of liquid chocolate to the aerator 109 from the reservoir outlet 130 and the tempering unit 111.

Similarly, a variable speed pump 105 allows control of the rate of flow of liquid chocolate from the reservoir outlet 130 to the supply conduit 123.

Thus control of the relative speeds of pumps 105 and 107 allows control of the ratio of the rate of flow of liquid chocolate to the supply conduit 123 to the rate of flow of liquid chocolate to the supply conduit 125.

In the event that the pump 105 is set so that only a negligible flow of liquid chocolate is fed to supply conduit 123, then full aeration is achieved as is the case with the apparatus shown in FIG. 2A, and the potential benefits of recirculating all of the excess material through the aerator 109 can be achieved.

When a density meter 119 is provided, the output of density meter 119, which is a measure of the density of the chocolate in the combined supply 133, may be used to control the gas flow rate to the aerator 109 so as to achieve a desired overall degree of aeration of the chocolate being fed to the inlet of the coating head 115.

Alternatively, the output of density meter 119 may be used to control the relative speeds of pumps 105, 107 commensurate with the total flows of pumps 105 and 107 remaining constant, the speed of pump 105 being increased and the speed of pump 107 being decreased, if the density meter 119 indicated an increase in gas content (and vice versa in response to an indication of a decrease in gas content).

The system of FIG. 13 provides a high degree of flexibility in that the proportion of the material from reservoir 101 that is recirculated through the aerator 109 can be varied over a wide range, from 0% to 100% if required. This enables the process to be set up to optimise the relationship between product quality, capital cost of equipment and/or throughput. By choosing a set-up in which a proportion of the chocolate is recirculated by pump 105 and conduit 123 from reservoir 101 to the coating head 115, an aerator 109 of r educed capacity, and therefore of lower cost, can be employed.

The disadvantage of not re-aerating all of the chocolate from reservoir 101 is that micro-bubbles can tend to agglomerate in reservoir 101 to form visible bubbles which could create surface blemishes on the coated product, whereas such visible bubbles would be broken up into micro-bubbles if they were to be recirculated through the aerator 109. Since different chocolates behave in different ways, the apparatus of FIG. 13 enables the process to be tuned, in terms of the proportion of chocolate to be recirculated through the aerator, to provide a maximum output at the required quality.

FIG. 3 shows a manifold 9' in the form of a stainless steel tube 30 provided with an inlet 31, removable end caps 32 being secured on the end of the tube 30, each end cap being provided with a respective pressure relief valve 33, the end caps being capable of withstanding a pressure differential of 8 Bar. The use of pressure relief valves 33 enables a positive displacement pump 10 to be employed. Valves 33 can be set typically at 4 Bar excess internal pressure.

An outlet slot 34 extends for the full length of the manifold and, as shown in FIG. 4, the width of the outlet slot is determined by an elongate flow adjuster plate 35 of arcuate transverse cross-section, suitable releasable securing means, not shown, being provided to retain the plate 35 in sealing engagement with the outer surface of tube 30.

The slot 34 is thus defined between the free edge of plate 35 and a radial anvil plate 36 which assists in creating a curtain of aerated chocolate which hangs down from anvil plate 36.

In an alternative construction of manifold, not illustrated, the stainless steel tube 30 is provided in its underside with a series of holes, instead of a slot, the holes being of a suitable size and spacing to produce a curtain of chocolate.

Figure 5:
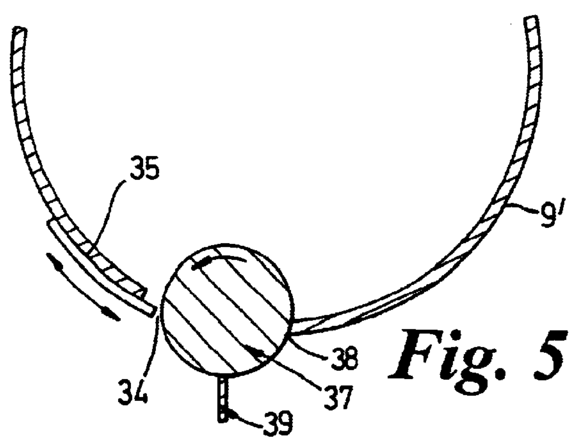
FIG. 5 is a cross-section similar to FIG. 3 but of a manifold coating head incorporating an outlet roller.

FIG. 5 shows a further alternative construction of manifold assembly in which slot 34 is defined between the free edge of a similar adjuster plate 35 and a driven roller 37 which is rotated in the sense to carry aerated chocolate through the slot 34. Roller 37 is in rubbing contact with the tube margin at 38.

A fixed scraper 39 is positioned directly below roller 37 to remove the chocolate from the roller thereby to create a curtain of aerated chocolate.

The arrangement of FIG. 5 utilises a manifold pressure of approximately 4 Bar above atmospheric pressure.

Rollover of chocolate is minimised by the arrangements of FIGS. 3 to 5, thereby helping to preserve the integrity of the bubbles of air in the chocolate.

Figure 6:
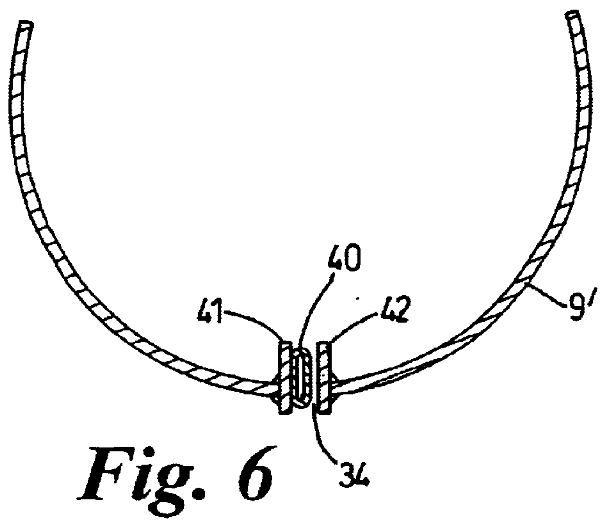
FIG. 6 is a cross-section similar to FIG. 4 but of a manifold assembly in which the outlet is defined in part by an inflatable tube.
Figure 7:
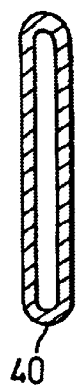
FIG. 7 is an enlarged cross-sectional view of the tube of flattened form, shown in an unpressurised condition, employed in the assembly of FIG. 6.

In FIG. 6 an inflatable tube 40, of flattened form shown in FIG. 7, defines one side of the outlet slot 34, the tube being bonded to one plate 41 of a pair of anvil plates 41, 42. The interior of the tube is subjected to a pressure for controlling the resistance to chocolate flowing through slot 34. The tube 40 can act as an automatic pressure relief valve since if the pressure inside the manifold tube 9' tends to rise then the tube 40 will become more flattened to allow slot width 34 to increase, thereby tending to relieve the manifold pressure.

Figure 8:
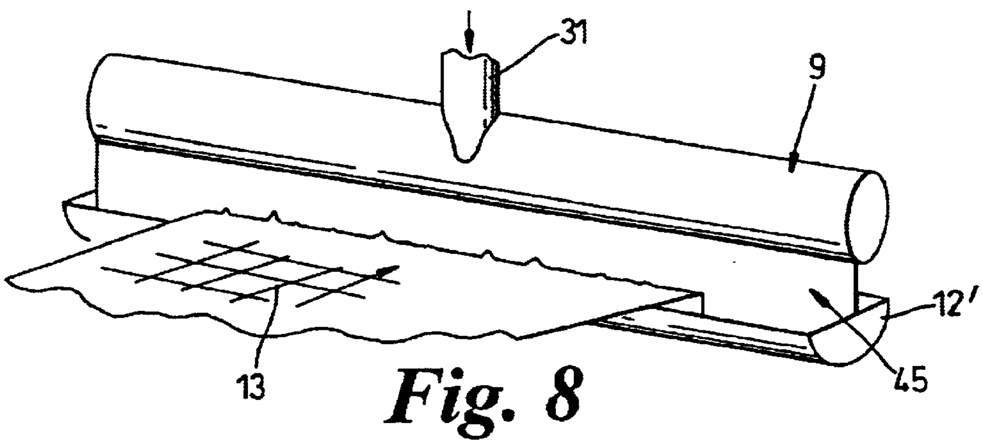
FIG. 8 is a schematic perspective view of an enrobing assembly in accordance with the invention for use with aerated chocolate and suitable for coating both the top and bottom of items carried by the foraminous conveyor.

FIG. 8 shows a coating head assembly for producing an aerated coating over all surfaces of the items carried by foraminous conveyor 13. The coating head assembly comprises an elongate manifold 9' which can be of the form shown in the previous Figures, and produces a vertical curtain 45 of aerated chocolate of a length greater than the width of conveyor 13, a trough 12' of length substantially equal to that of manifold 9' being positioned beneath the conveyor path in order to collect the surplus curtain material, and then to provide a supply of aerated chocolate for coating the underside of the conveyed items, a suitable roller applicator, not shown, being located in trough 12'.

The excess length of the curtain relative to the width of the conveyor provides sufficient chocolate to the trough 45 to coat the underside of the items to the desired thickness of bottom coating.

When the manifold ends are provided with pressure relief valves, then the trough 45 should be of sufficient length to catch any surplus material from the relief valves, or a separate collection means should be provided to return the surplus material to return reservoir 6, FIG. 2A.

Figure 9:
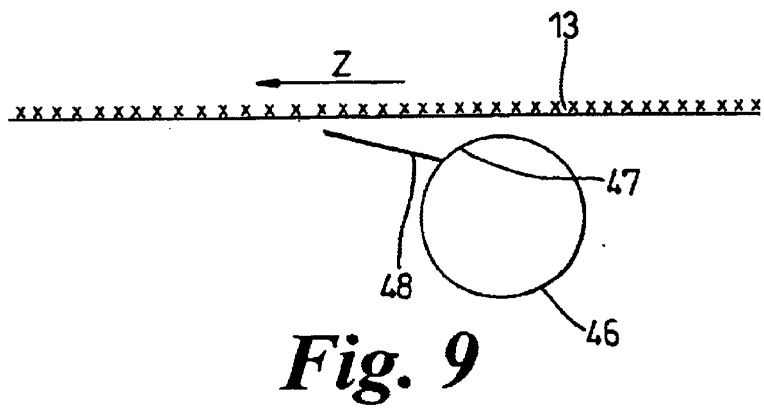
FIG. 9 is a vertical cross-section of a coating head in the form of a manifold assembly for producing a ribbon of aerated chocolate for application to the underside of articles carried by the conveyor.

FIG. 9 shows a coating head in the form of a tubular manifold 46 positioned beneath a foraminous, wire conveyor 13, the manifold being provided in about the 10 o'clock position with an outlet slot 47 through which a ribbon of chocolate is extruded, the ribbon being guided upwardly and generally in the direction Z of conveyor travel by an inclined elongate guide plate 48, plate 48 extending close to the conveyor 13, whereby the chocolate ribbon is applied to the underside of items carried by the conveyor 13. This arrangement is suitable for providing an aerated chocolate coating on the underside of items to produce a 'half-coated' product.

Figure 10:
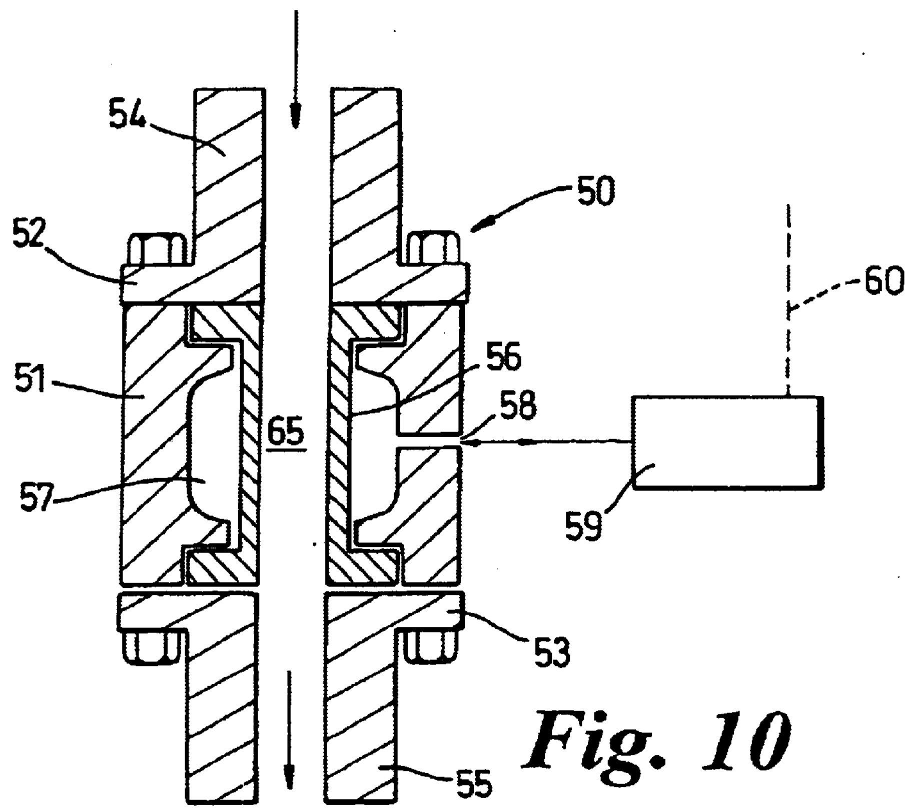
FIG. 10 is a side view, in section, of a flow restrictor suitable for positioning in the vicinity of an open-to-atmosphere coating head.
Figure 11:
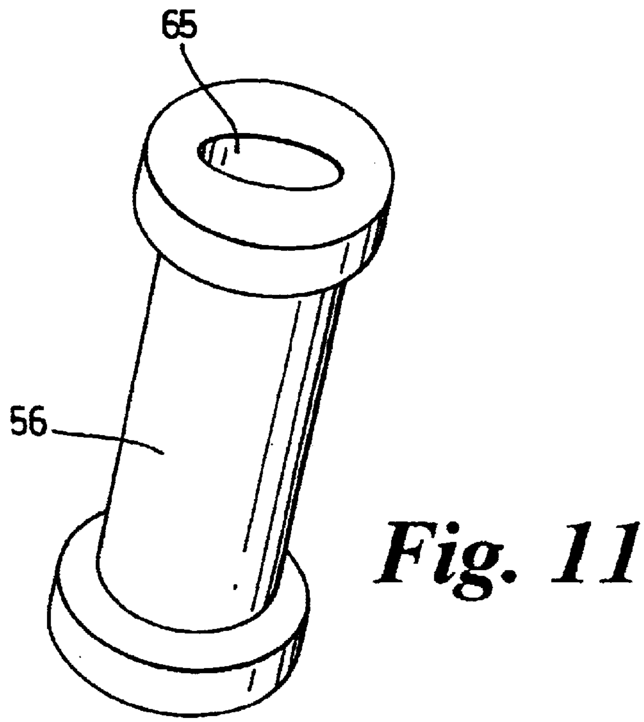
FIG. 11 is a view in perspective of the deformable duct incorporated in the restrictor of FIG. 10.

FIGS. 10 and 11 together illustrate back-pressure means in the form of a flow restrictor 50 suitable for positioning in the vicinity of the coating head, just prior to the inlet thereof, as in FIG. 2B.

The flow restrictor 50 comprises a tubular housing 51 clamped between flanged ends 52, 53 of a product inlet 54 and a product outlet 55. The housing 51 locates a deformable (rubber) duct 56 and defines a control chamber 57 surrounding the middle of the duct. A control passageway 58 connects the chamber 57 with a controllable source 59 of pressurised air. A signal line 60 is used to adjust air pressure within the chamber 57.

The duct 56 has a bore 65 of oval cross-section. In operation, an increase in control air pressure within the chamber 57 will tend to flatten the oval-section bore 65 of the deformable duct 56 so as to restrict product flow through the restrictor 50. Alternatively, a decrease in control air pressure within the chamber 57 will enlarge the cross-section of the bore 65 thus allowing product flow to increase.

Gas other than air may be used for control purposes. For example, pressurised nitrogen may be used.

The pressurised gas, (for example air or nitrogen) used to control the flow restrictor 50 is preferably the same as that used for aerating purposes and may then be connected to the same supply source of said gas.

Bubble size measurements. The following material is based on a study made by the Campden & Chorleywood Food Research Association Group. FIG. 20 is a table showing an analysis of microscope measurements of bubble size in bar samples of aerated chocolate issuing from the coating head of a coating facility similar to that of FIG. 2A. Histograms of the measurements made on individual samples, from which the table of FIG. 20 is compiled, are given in FIGS. 14 to 19. In order to create the samples, sampling moulds were positioned in the stream of aerated chocolate issuing from the coating head, and the moulds were removed and allowed to cool. The bar samples were then sectioned, and the diameters of individual bubbles in the sections were then recorded (as mean air pocket size) and a statistical analysis of the measurements for each bar sample was carried out in the usual way.

Figure 14:
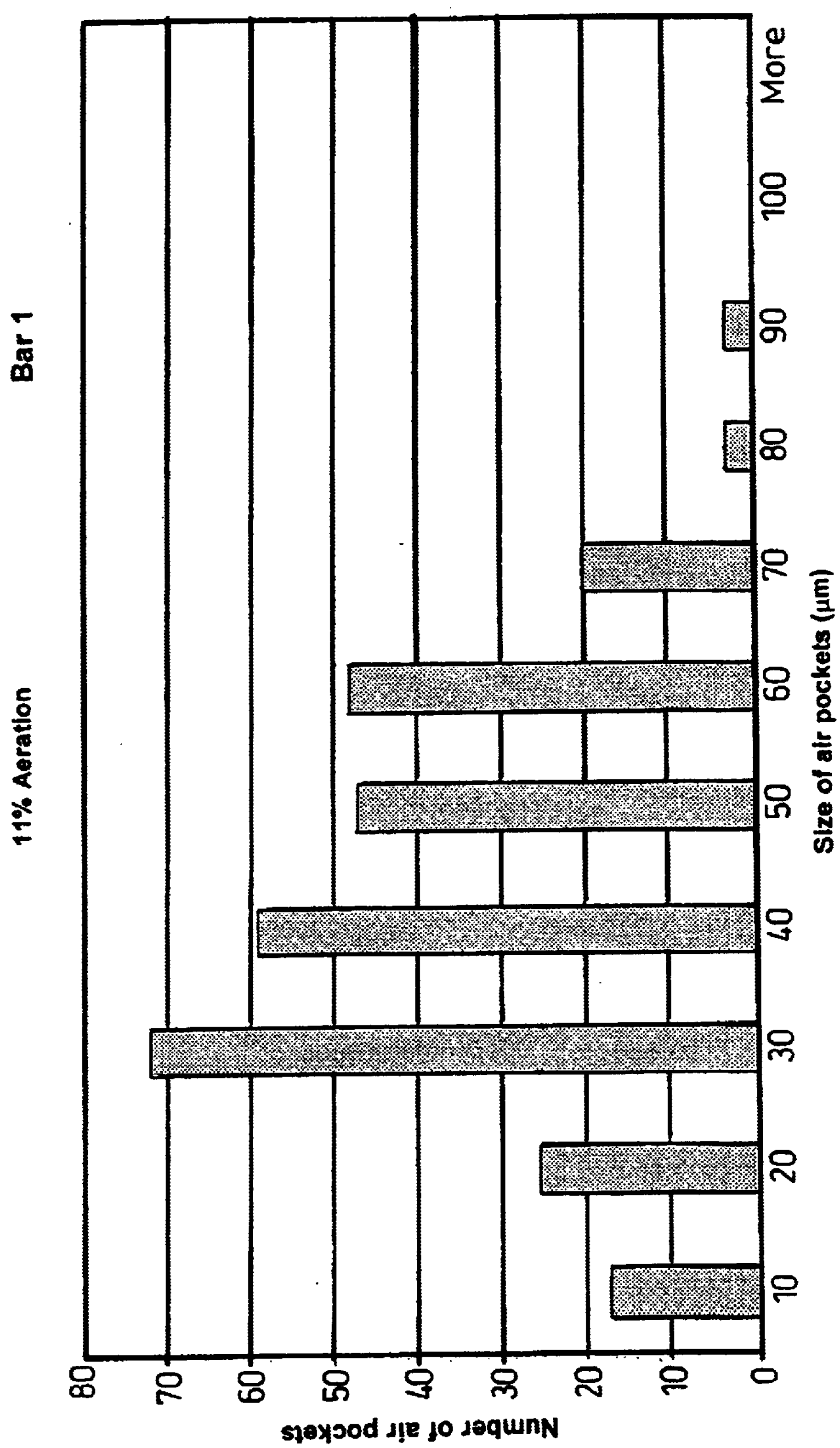
FIGS. 14 to 19 are histograms showing bubble size measurements of samples of aerated chocolate produced by the coating head of the apparatus of FIG. 2A.
Figure 15:
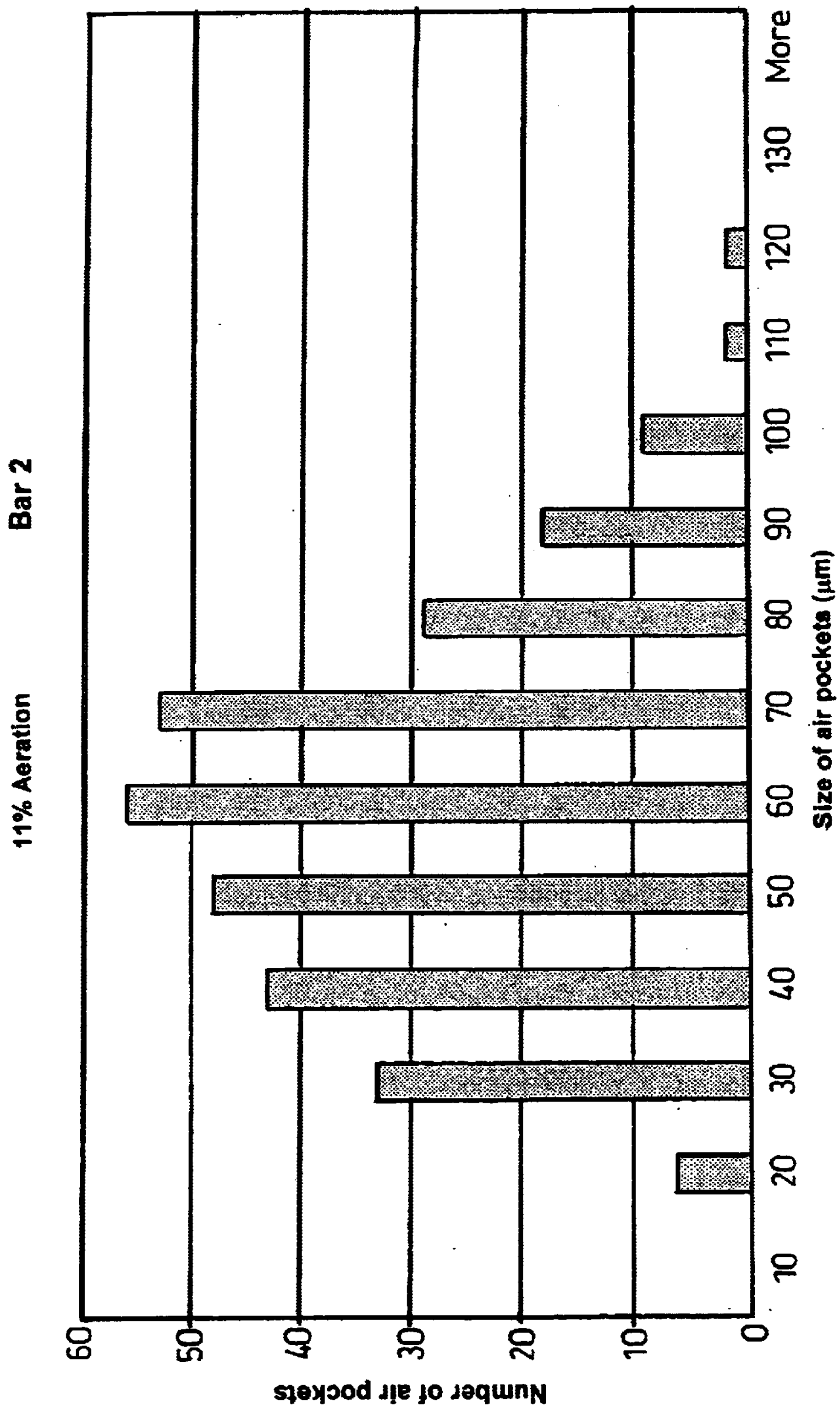
Figure 16:
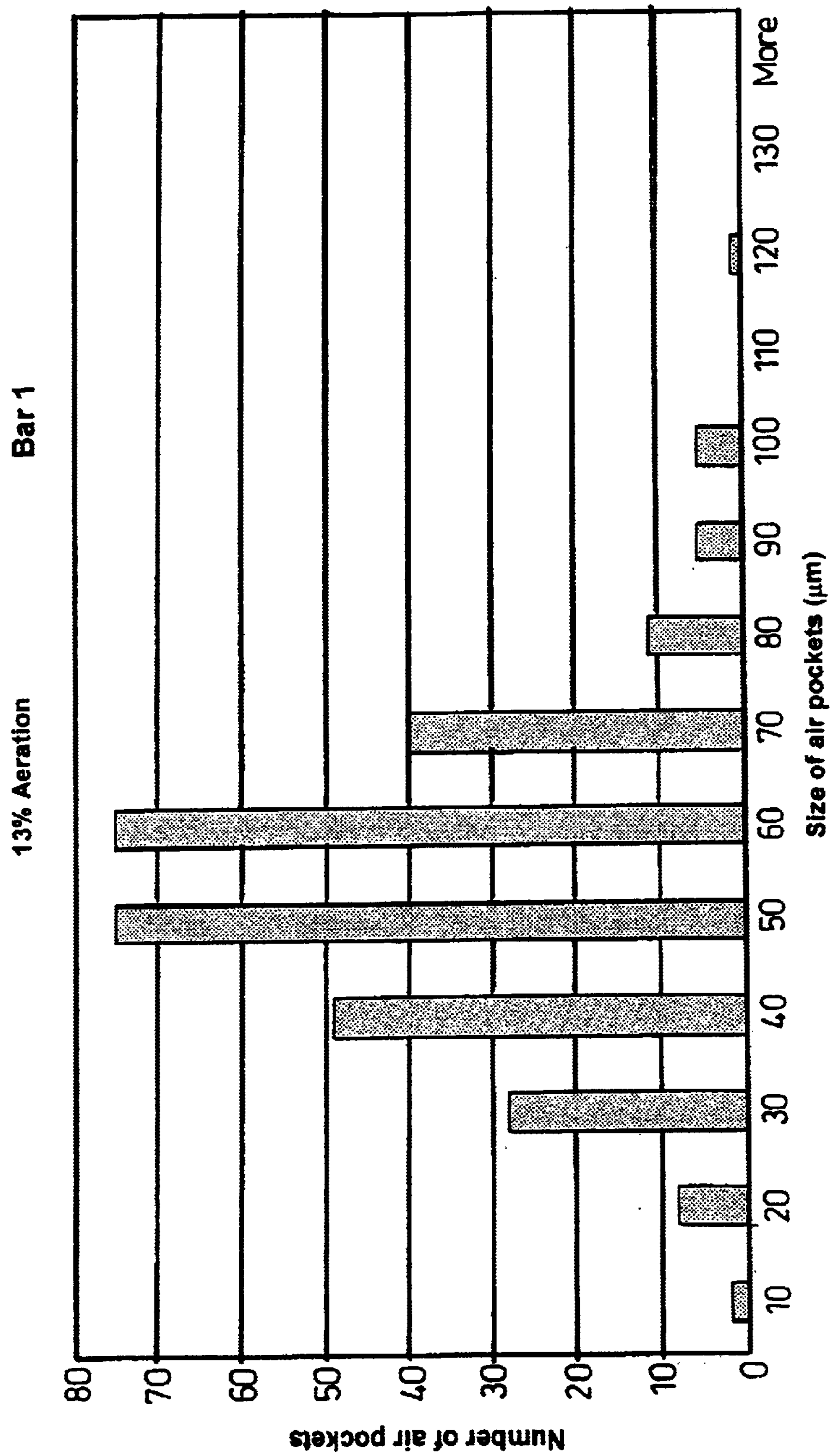
Figure 17:
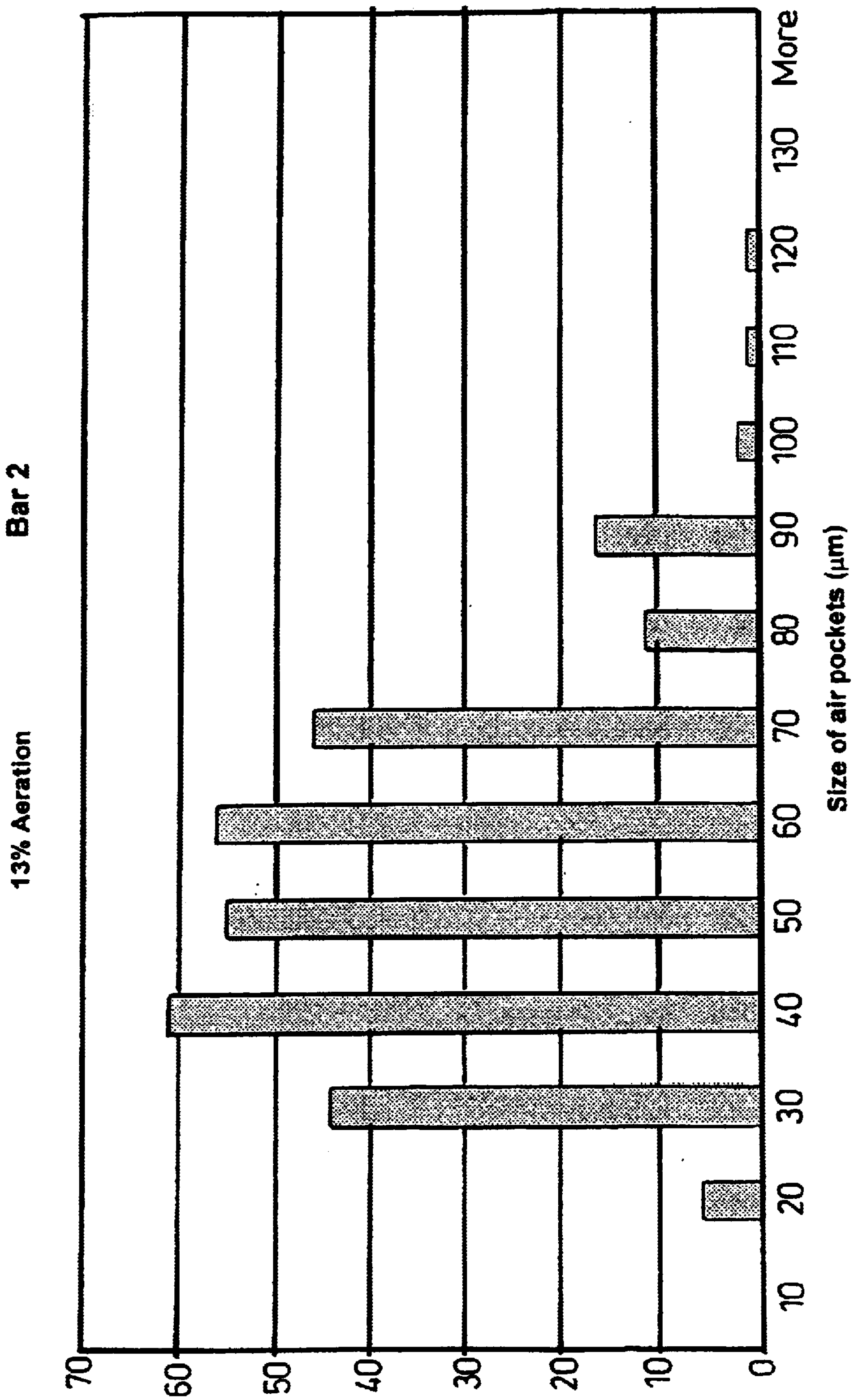
Figure 18:
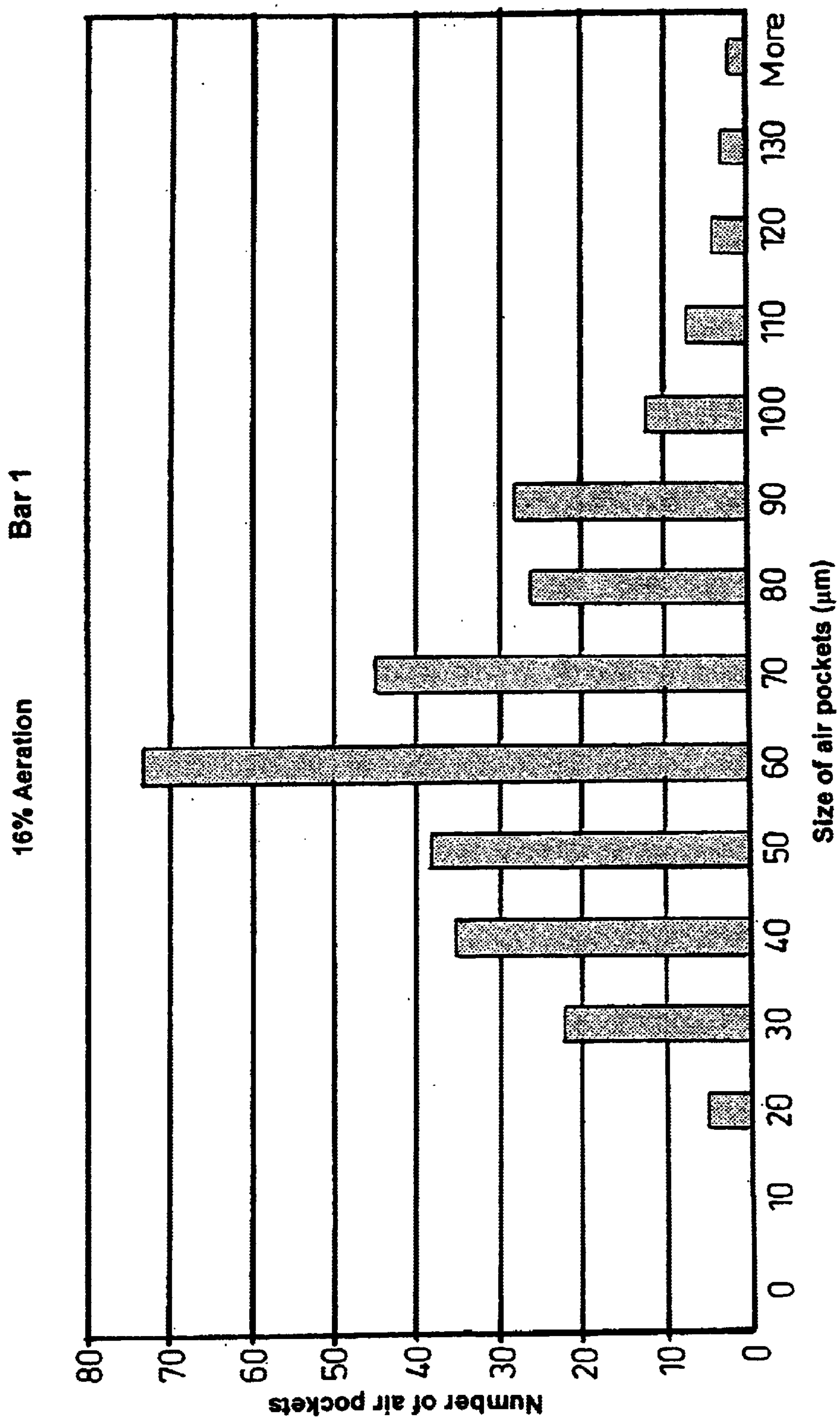
Figure 19:
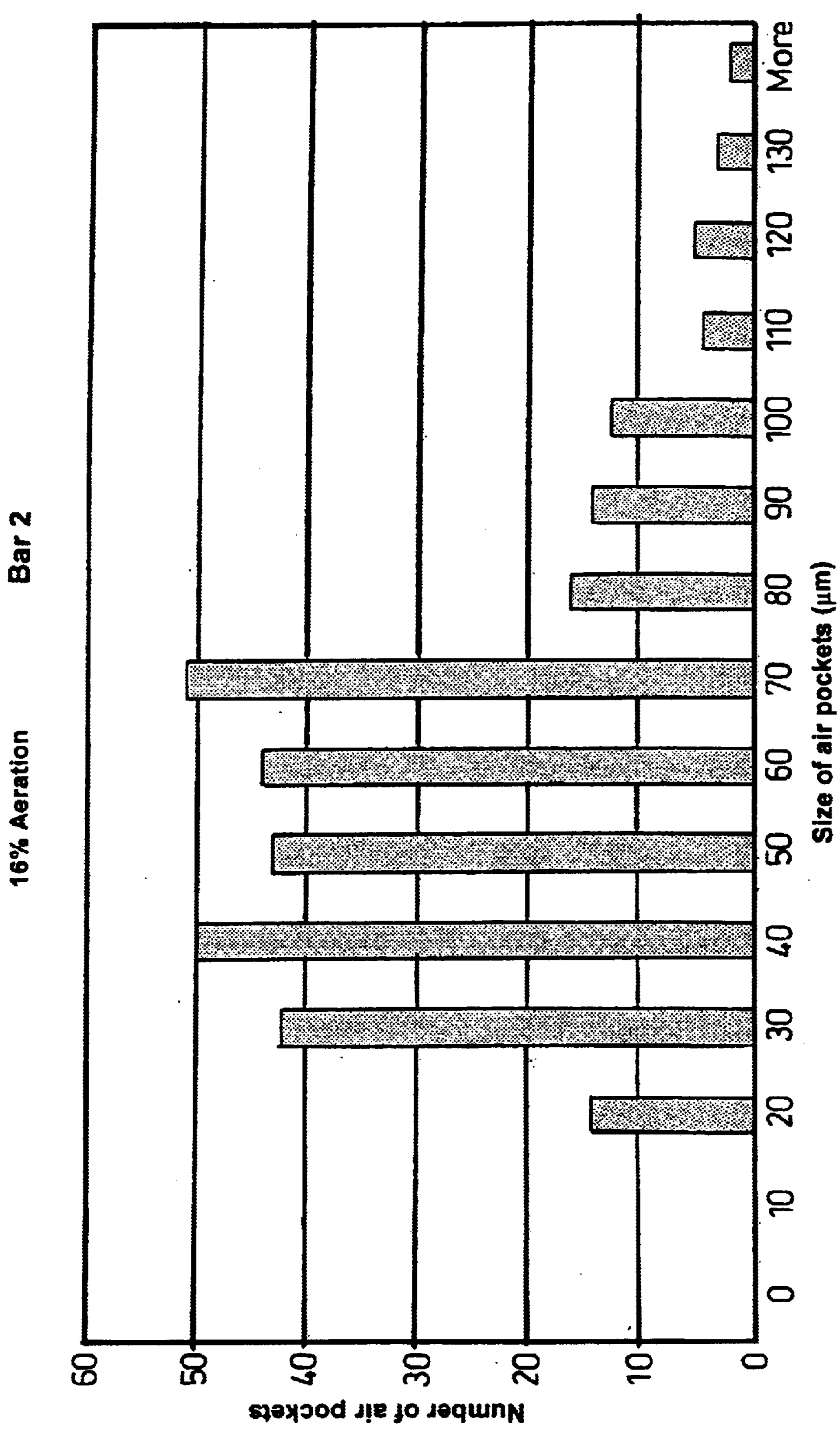

It will be seen from FIG. 14 that the mean air pocket size was about 50 μm with a standard deviation of no more that about 10 μm, and that this bubble size varied little over the range of 11% aeration to 16% aeration.

In these figures 11% aeration means that the specific density of the un-aerated solid chocolate has been reduced by 11% in the aerated chocolate sample, and corresponding figures apply for the other levels of aeration.

What is claimed is:

1. A process for producing a aerated confectionery coating is characterized in that it comprises supplying a liquid confectionery material to a coating head, maintaining the material under substantial super-atmospheric pressure up to the vicinity of the coating head, and forming, by gas injection, gaseous bubbles in the pressurised confectionery material prior to the confectionery material reaching the coating head, the rate of injection of gas into the confectionery material being controlled in response to measure of the density of confectionery material in the supply to the coating head, excess liquid confectionery material delivered by the coating head being recirculated into said supply.

2. A process according to claim 1, wherein the gaseous bubbles are of generally microscopic size.

3. A process to claim 1 wherein injection of gas into the pressurised confectionery material is by means of an aerator controllable to take account that fress coating material being supplied from the material source is not aerated, whereas the recirculated material is generally still at least partially aerated.

4. A process according to claim 1 wherein at least some of the excess liquid confectionery material is supplemented by fresh coating material.

5. A process according to claim 4 wherein said at least some of the excess liquid confectionery material and the fresh coating material are together subjected to aeration before passage to the coating head.

6. A process according to claim 5, herein a first proportion of excess confectionery material is recirculated to the coating head to form one supply thereto, and a second proportion of excess confectionery material is recirculated to the coating head to form a second supply thereto.

7. A process according to claim 6, wherein said second supply is subjected to de-aeration downstream of the coating head.

8. A process according to claim 1 wherein the excess confectionery material is collected in a reservoir from which some of said material is subjected to de-tempering and de-aeration, before recirculation in the supply to the coating head.

9. A process according to claim 1 wherein a density measurement is made at a position in the pressurised supply that is downstream of the point where aeration takes place.

10. A process according to claim 1 wherein the aeration device is controlled in response to a measure of the density of the confectionery material at a point upstream of where aeration takes place.

11. A process according to claim 1 wherein after injection of gas the confectionery material is subjected to shearing forces in order to reduce gas bubble size.

12. A process according to claim 1 wherein pressure of coating material after aeration is substantially in the range 2–10 atmospheres, above atmospheric pressure.

13. A process according to claim 12, wherein pressure of the coating material after aeration is in the range 3 to 6 atmospheres above atmospheric pressure.

14. A process according to claim 1 wherein pressure in the pressurised supply of confectionery material is created by a back-pressure means in the form of a flow restrictor positioned in the vicinity of the coating head, just prior to the inlet thereof.

15. A process according to claim 1 wherein the coating head has an open-to-atmosphere inlet.

16. A process according to claim 14, wherein the flow restrictor comprises a deformable duct and means for applying an external deforming force to the duct in a controlled manner so as to vary the cross-sectional of the duct.

17. A process according to claim 1 wherein the coating head comprises an elongate manifold provided with an inlet and with an elongate outlet slot extending for substantially the full length of the manifold, the width of the slot being controllable by an adjustable gate.

18. A process according to claim 17, wherein the gate comprises a rigid elongate member which is slideably adjustable in the transverse direction thereof to control the width of the outlet slot.

19. A process according to claim 18, wherein the gate comprises an inflatable tube, the internal pressure of the tube being controllable so as to effect adjustment of the width of the outlet slot.

20. A process according to claim 17 wherein the manifold comprises a tube provided with removable end caps.

21. A process according to claim 17 wherein the manifold is provided with an outlet roller which in part defines the outlet slot, and a roller scraper is provided externally of the manifold for removing confectionery material carried round by the roller, in order to create a curtain of material which hangs down from the scraper.

22. A process according to claim 1 provided with means for coating the underside of items as well as the top of the items, said means comprising a trough positioned beneath the coating head under a foraminous conveyor which conveys the items past the coating head, and means for applying the coating material in the trough to the underside of the items.

23. A process according to claim 22 wherein the means for coating the underside of the conveyed items comprise providing the manifold disposed beneath the foraminous conveyor, with an outlet slot which is directed generally upwards and beneath the conveyor, the pressure in the manifold being made sufficient to cause a ribbon of coating material to be extruded with an upward component of movement in order to contact the underside of the conveyed items.

24. A process according to claim 23, wherein an upwardly-inclined guide plate is provided adjacent to the manifold outlet slot for guiding the extruded ribbon of confectionery material in an upward direction from the manifold, and towards the underside of the receding items on the conveyor.

25. A process according to claim 1 comprising supplying a coating head with at least two supplies of liquid confectionery material, at least one of the at least two supplies of liquid confectionery material being injected wit gaseous bubbles.

26. A process according to claim 1 wherein the coating head 70 is provided with at least two supply conduits in communication with the inlet of the coating head, and aeration means connected to at least one of the supply conduits, said aeration means being operative to inject gaseous bubbles into liquid confectionery material carried by the at least one supply conduit connected to said aeration means.

27. Edible products coated with a aerated confectionery coating, the coating having been applied to the product by the process as claimed in claim 1.

28. A coated product as claimed in claim 27 in which the product is a biscuit.

29. A coated product as claimed in claim 27 in which the product is a confectionery item.

30. Apparatus for supplying a coating head with aerated liquid confectionery material, the apparatus comprising an aerator for aerating liquid in a material supply to the coating head with gaseous bubbles, characterised by coating head flow restrictor for generating in use a substantial super-atmospheric pressure in the supply up to the vicinity of the coating head, and a density measuring device adapted to measure the density of the aerated liquid in the liquid supply, and to control the amount of aeration provided by the aerator in response to the measured density.

31. Apparatus for producing an aerated confectionery coating, the apparatus comprising a coating head, aeration means to form, by gas injection, gaseous bubbles within liquid confectionery passing through the aeration means, collection means for collecting excess liquid confectionery material delivered by the coating head and for feeding the excess material for re-use, characterised by first and second supply conduits which each extend to a inlet to the coating head, in that the aeration means is arranged in the first supply conduit, and in that excess material from the collection means is fed to at least the second conduit of said conduits.

32. Apparatus according to claim 31, wherein the first and second supply conduits are in communication with the coating head by way of a common inlet.

33. Apparatus according to claim 32, provided with means for measuring the density of the combined supply of liquid confectionery material to the coating head and for using the measurement in order to control the aeration means or the relative flows in the supply conduits.

34. Apparatus for producing an aerated chocolate coating on a product, the apparatus comprising a coating head, a supply conduit to the coating head from an aeration means, and means for maintaining the supply at a substantial super-atmospheric pressure up to the vicinity of the coating head, a reservoir for collecting excess chocolate delivered by the coating head, a recirculation means for returning excess chocolate directly from the reservoir to the aeration means, at least most of the excess chocolate having passed through a de-aerator, whereby an amplification of the amount of aeration present in the chocolate applied to the product is produced by recirculating excess aerated chocolate through the aeration means, and a fresh chocolate supply for supplementing the excess chocolate with fresh chocolate from a temperer.

35. Apparatus as claimed in claim 34 in which the fresh chocolate supply leads into the reservoir.

36. Apparatus as claimed in claim 34 in which the fresh chocolate supply has a connection from an overflow to the main reservoir, the connection containing a de-aerator.

37. Apparatus as claimed in claim 34, in which the aeration means is arranged to the subject the liquid chocolate to shearing forces in order to reduce gas bubble size.

38. A process for producing an aerated chocolate coating on products comprising supplying liquid chocolate to a coating head, maintaining the chocolate under substantial super-atmospheric pressure up to the vicinity of the coating head, forming, by gas injection in an aerator, gaseous bubbles in the pressurised chocolate prior to the chocolate reaching the coating head, excess liquid chocolate delivered by the coating head being collected in a reservoir a d being recirculated into said supply, upstream of the aerator, and without being substantially de-aerated, to provide an amplification of the amount of aeration present in the chocolate when applied to the product, and supplementing the excess liquid chocolate by fresh chocolate by fresh chocolate fed from a temperer.

39. Edible products coated with an aerated chocolate coating, the coating having been applied to the product by the process as claimed in claim 38.

40. Edible products as claimed in claim 39 wherein the distribution curve of the size of bubble in the coating has a curve peak which corresponds to a bubble diameter of less than 75 $\mu$m.

41. Edible products as claimed in claim 40 wherein the distribution curve peak corresponds to bubble diameter of less that 60 $\mu$m.

42. Edible products as claimed in claim 41 wherein the distribution curve peak corresponds to bubble diameter of substantially 50 $\mu$m.

* * * * *